United States Patent [19]

Vantellini

[11] Patent Number: 5,172,729
[45] Date of Patent: Dec. 22, 1992

[54] EXPANSION HOSE FOR THE REDUCTION OF PRESSURE PULSATIONS

[76] Inventor: Edoardo Vantellini, Via Gemelli 6, I-20042 Albiate/Milano, Italy

[21] Appl. No.: 634,207
[22] PCT Filed: Apr. 30, 1990
[86] PCT No.: PCT/CH90/00117
 § 371 Date: Jan. 28, 1991
 § 102(e) Date: Jan. 28, 1991
[87] PCT Pub. No.: WO90/14549
 PCT Pub. Date: Nov. 29, 1990
[51] Int. Cl.⁵ ............................................ F16L 55/04
[52] U.S. Cl. ..................................... 138/26; 181/255; 417/540
[58] Field of Search ................. 138/26, 30, 44, 42, 138/109, 111, 113, 114; 417/540; 181/212, 215, 247, 248, 255

[56] References Cited

U.S. PATENT DOCUMENTS

| | | | |
|---|---|---|---|
| 696,277 | 3/1902 | Sponseller et al. | 138/26 |
| 2,238,146 | 4/1941 | Yavitch | 138/42 |
| 3,144,904 | 8/1964 | Kahn et al. | 138/42 |
| 3,165,123 | 1/1965 | Hawkins | 138/30 |
| 3,276,477 | 10/1966 | Bleasdale | 138/30 |
| 3,766,992 | 10/1973 | Tiraspolsky et al. | 417/540 |
| 4,611,633 | 9/1986 | Buchholz et al. | 138/26 |
| 4,794,955 | 1/1989 | Ejima et al. | 138/30 |

FOREIGN PATENT DOCUMENTS 3809310 10/1988 Fed. Rep. of Germany .

*Primary Examiner*—James E. Bryant, III
*Attorney, Agent, or Firm*—Laurence R. Brown

[57] ABSTRACT

The expansion hose specifically for power steering plants of automobile vehicles includes an outer pressure hose with a high lateral volume expansion connected to an inlet side end piece and an outlet side end piece and an inner flexible hollow body as well extending coaxially thereto and which is connected at the inlet side to a nipple plug of the inlet side end piece and extending freely up into the outlet side end piece and into its outlet channel whereby its outer diameter is less than the surrounding outlet channel. A reverse flow of the pressure medium into the space between the outer pressure hose and the inner flexible hollow body takes place through an annular gap formed thereby and the pressure medium flows into this space through radial portholes formed in axial distances distributed in the inner flexible hollow body. In comparison with known expansion hoses simplification is achieved by a doing away with a throttle located in the center of and within the expansion hose. The desired reduction of the pressure pulsations is arrived at by the inner flexible hollow body extending into the outlet side piece.

2 Claims, 1 Drawing Sheet

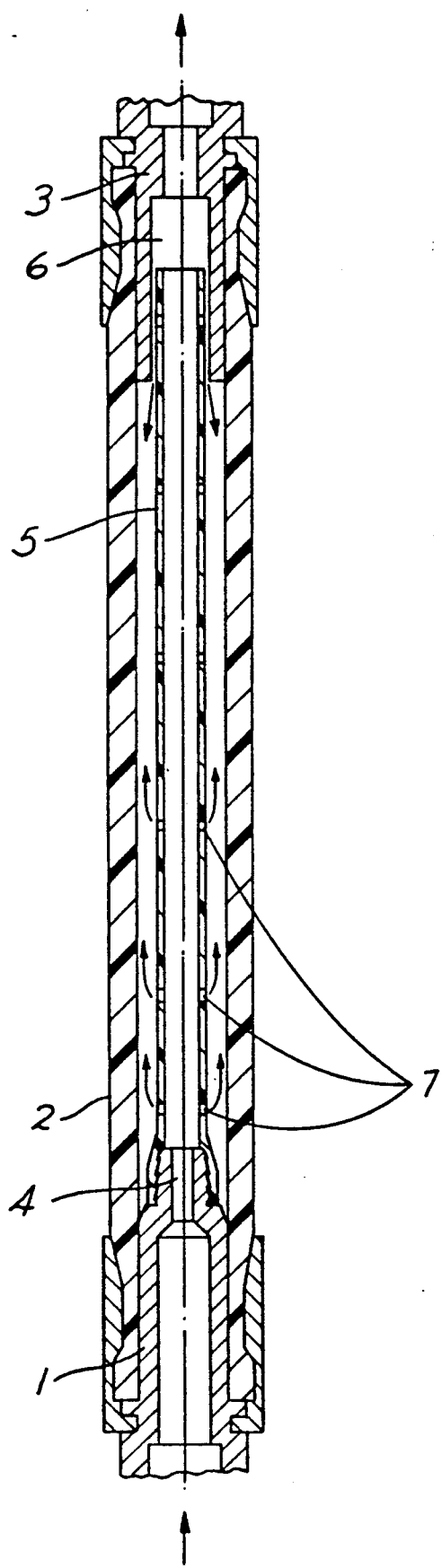

EXPANSION HOSE FOR THE REDUCTION OF PRESSURE PULSATIONS

BACKGROUND OF THE INVENTION

1. Field of the Invention

The invention refers to an expansion hose for the reduction of pressure pulsations in hydraulic systems.

Such expansion hoses are employed among others in power steering plants of automotive vehicles, in which the expansion hose reacts at varying operating pressures with a change of the volume of the hose by expansion and reduces therewith the pressure pulsations originating from the pump. This reduction of the pressure pulsations depends from the length, the cross-section and the volume expansion of the expansion hose. Because, however, it is not possible to arbitrarily select for instance in a vehicle the above mentioned values due to the limited space available for the mounting the desired reduction of the pressure pulsations is in many cases not sufficient.

2. Description of the Prior Art

In order to obtain better results it is already known to arrange in the outer expansion hose a further inner flexible hose which at the one end is connected to the inlet side end piece and ends freely with its other open end in the outer expansion hose. It is, furthermore, also known to forsee additionally a throttle member about at the center of the outer expansion hose and which divides the outer expansion hose into two hose chambers which communicate with each other through a throttle port whereby the inner hose comprises at the area of the first chamber located at the inlet side radial ports into the first hose chamber. The flow resistance in the inner hose shall, thereby, lead to a phase shift between the two hydraulic flows into the hose chambers at the inlet end and the outlet end wherewith a reduction of a pulsation and noise is obtained.

It has, however, now been found that this expenditure for a reaching the desired object is not at all necessary. Furthermore, there can be a problem at the known expansion hose in that the inner hose ends freely in the outer hose because it depends here from the material selected for the inner hose; if not a uncontrollable position of the two hoses relative to each other leads to a damaging at the inner side of the outer hose by which finally a defect of the expansion hose results for which the reason is not immediately recognizable.

SUMMARY OF THE INVENTION

It is, therefore, a general object of the present invention to provide an expansion hose which regarding structural design and production is simple and has the desired properties and by which the danger of damage by the hoses coming into contact with each other does not exist.

A further object is to provide an expansion hose in which the inner flexible body extends freely up and into the outlet side end piece into its outlet channel and its outer diameter is less than the outlet channel surrounding same.

Yet a further object is to provide a flexible hose in which an inner flexible hollow body which can be a hose or a flexible tube is held in the outlet side end piece whereby such an amount of clearance is present that a reverse flow of the pressure medium through the annular gap into the space between the inner and the outer hose occurs.

Still a further object is to provide a flexible hose in which the pressure medium reaches the space between the inner and outer hose through radial portholes arranged distributed over the entire length of the inner flexible hollow body.

BRIEF DESCRIPTION OF THE DRAWING

The invention will be better understood and objects other than those set forth above will become apparent when consideration is given to the following detailed description thereof. Such description makes reference to the annexed drawing wherein:

the single figure illustrates a longitudinal section through an expansion hose.

DETAILED DESCRIPTION OF THE PREFERRED EMBODIMENT

An outer pressure hose having a high lateral volume expansion 2 is connected to an inlet side end piece 1 which is rigidly connected at its other end to an outlet side end piece 3. The inlet side end piece 1 includes furthermore a nipple plug 4, to which an inner flexible hollow body 5 is connected which extends coaxially to the outer pressure hose and through same and which can be a flexible tube, a hose or also a spirally wound strand of material.

This flexible hollow body 5 extends at its end section freely into the outlet channel 6 of the outlet side end piece 3 and its outer diameter is less than the outlet channel enclosing same such that a ring-shaped gap exists therebetween, such that a reverse flow of the pressure medium takes place through the gap into the space between the inner hollow body and the outer pressure hose. The pressure medium reaches this space, furthermore, also from the inner flexible hollow body 5 through axially spaced radial portholes 7 located therein which are distributed over the entire length. The size of these portholes, the number thereof and the distance apart set according to the respective application.

An expansion hose of this kind is used specifically for powersteering plants of motor vehicles. In the pressure hose described herein reciprocal pressure changes occur which lead to a considerable reduction of the pressure pulsations. The magnitude of this reduction depends from the length and volume expansion of the outer pressure hose 1, of the operating pressure and also from the dimensions of the flexible inner hollow body 5 and further from the dimensions and position of the radial portholes 7 as well. By an optimal balancing an almost pulse-less flow of the pressure medium can be reached in selected pressure and flow ranges. Because the inner flexible hollow body 5 is held in the outlet side end piece 3 the outer hose can not be damaged, such as is possible at known expansion hoses having an inner hose ending freely in the outer hose.

While there is shown and described a present preferred embodiment of the invention, it is to be distinctly understood that the invention is not limited thereto, but may be otherwise variously embodied and practiced within the scope of the following claims.

I claim:

1. An expansion hose for reduction of pressure pulsations in hydraulic systems and noises associated therewith caused by the pump, specifically for power-steering systems of motor vehicles comprising in combination, an outer pressure hose with a high lateral volume expansion capacity, an inner flexible hollow body arranged coaxially within said pressure hose for conduction of a pressure medium, an inlet-side end piece terminating in a nipple plug, an outlet-side end piece, both said end pieces being made of a non-deformable material, and structure defining an outlet bore extending into said outlet-side end piece, said flexible hollow body having an outer diameter which is smaller than the inner diameter of said outlet bore, said outer pressure hose extending between and having ends connected to said inlet-side end-piece and said outlet-side end-piece, said inner flexible hollow body being firmly connected at the inlet side to said nipple plug of the inlet side end piece, said inner flexible hollow body including at least along a part of its length ports through the inner flexible hollow body, said inner flexible hollow body having a length extending freely up to and into the outlet side end piece, outlet channel with an outer diameter of the inner flexible hollow body being less than the outlet bore diameter.

2. The flexible hose according to claim 1, in which said inner flexible hollow body is a flexible tube having radial portholes distributed over its entire length.

* * * * *